United States Patent [19]

Ferguson

[11] Patent Number: 4,848,183
[45] Date of Patent: Jul. 18, 1989

[54] CAMSHAFT DAMPER

[75] Inventor: Robert J. Ferguson, Marshall, Mich.

[73] Assignee: Simpson Industries, Inc., Litchfield, Mich.

[21] Appl. No.: 15,795

[22] Filed: Feb. 17, 1987

[51] Int. Cl.[4] ............................................. F16F 15/10
[52] U.S. Cl. ........................................ 74/574; 74/46.7; 464/7; 184/15.1
[58] Field of Search ............ 74/574, 604, 567, 573 R, 74/572, 605, 443, 467, 468; 123/90.31, 90.34, 192 B, 196 R, 192 R; 464/7, 89, 180; 474/94, 152; 188/380, 379; 184/15.1, 6.12

[56] References Cited

U.S. PATENT DOCUMENTS

| | | | |
|---|---|---|---|
| 1,301,258 | 4/1919 | Harley | 184/15.1 X |
| 1,638,118 | 8/1927 | Ford | 74/574 X |
| 1,916,086 | 6/1933 | Tibbets | 74/574 |
| 1,928,119 | 9/1933 | Vargha | 74/574 |
| 2,214,921 | 9/1940 | Criswell | 74/574 |
| 2,343,421 | 3/1944 | Porter | 74/574 |
| 2,594,555 | 4/1952 | Hardy | 74/574 |
| 2,636,399 | 4/1953 | O'Connor | 74/574 |
| 2,674,904 | 4/1954 | Dickson | 74/567 |
| 2,716,904 | 9/1955 | Schuldt | 74/574 |
| 2,795,037 | 6/1957 | Haushalter | 74/574 X |
| 2,861,472 | 11/1958 | Hansz | 74/574 |
| 2,932,984 | 4/1960 | Murray et al. | 74/574 |
| 3,057,220 | 10/1962 | Parr | 74/443 |
| 3,257,860 | 6/1966 | Runde et al. | 74/243 |
| 3,280,654 | 10/1966 | Arnt, Jr. | 29/451 |
| 3,388,614 | 6/1969 | Castelet | 123/90.31 |
| 3,457,624 | 7/1969 | Sullivan et al. | 29/450 X |
| 3,730,013 | 5/1973 | Slemmons | 74/243 |
| 3,869,938 | 3/1975 | Schlotterbeck et al. | 74/567 |
| 3,901,101 | 8/1975 | McGavern | 74/574 |
| 3,990,324 | 11/1976 | Fishbaugh et al. | 74/574 |
| 4,287,783 | 9/1981 | Ida et al. | 74/467 |
| 4,317,388 | 3/1982 | Wojcikeowski | 74/574 |
| 4,332,222 | 6/1982 | Papez | 123/90.31 X |
| 4,457,269 | 7/1984 | Beardmore | 123/90.31 |
| 4,583,504 | 4/1986 | Morris | 123/90.31 X |

FOREIGN PATENT DOCUMENTS

| | | | |
|---|---|---|---|
| 1937930 | 2/1970 | Fed. Rep. of Germany | 184/15.1 |
| 2752405 | 5/1979 | Fed. Rep. of Germany | 74/567 |
| 3609048 | 10/1986 | Fed. Rep. of Germany | 74/574 |
| 58-14257 | 3/1983 | Japan | 74/574 |
| 58-146745 | 9/1983 | Japan | 74/574 |
| 59-73643 | 4/1984 | Japan | 74/567 |
| 61-140670 | 6/1986 | Japan | 74/467 |
| 270876 | 5/1927 | United Kingdom | 74/467 |
| 423948 | 2/1935 | United Kingdom | 74/574 |
| 491717 | 9/1938 | United Kingdom | 74/574 |
| 689638 | 4/1953 | United Kingdom | 474/94 |
| 814062 | 5/1959 | United Kingdom | 74/573 R |
| 2173879 | 10/1986 | United Kingdom | 74/574 |

*Primary Examiner*—Rodney M. Lindsey
*Attorney, Agent, or Firm*—Beaman & Beaman

[57] ABSTRACT

A camshaft damper system for damping torsional vibrations within a camshaft for an internal combustion engine. The drive sprocket attached to the end of a camshaft includes radial projections and recesses meshing with the flexible camshaft drive belt or chain and the sprocket includes torsional vibration damping means in the form of an annular inertia ring and elastomeric member attaching the inertia ring to the sprocket wherein torsional vibrations are absorbed by the elastomeric material reducing wear on the camshaft and the camshaft-related components.

1 Claim, 1 Drawing Sheet

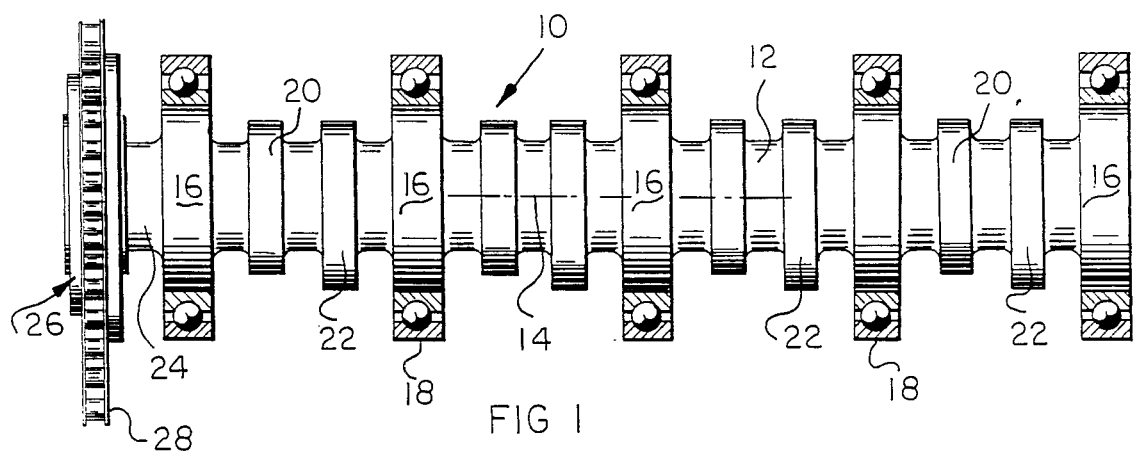
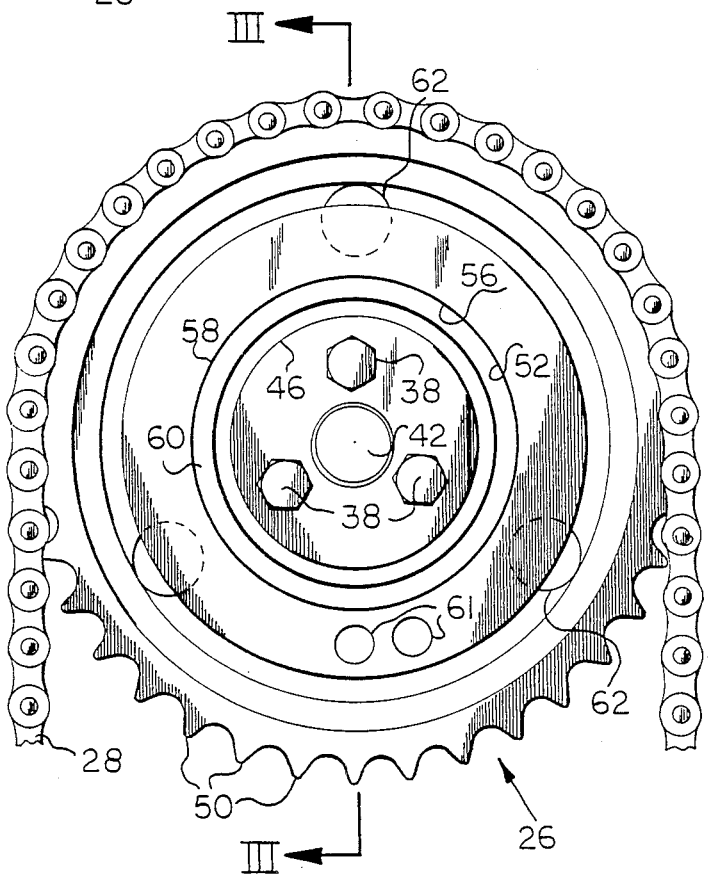
FIG 2
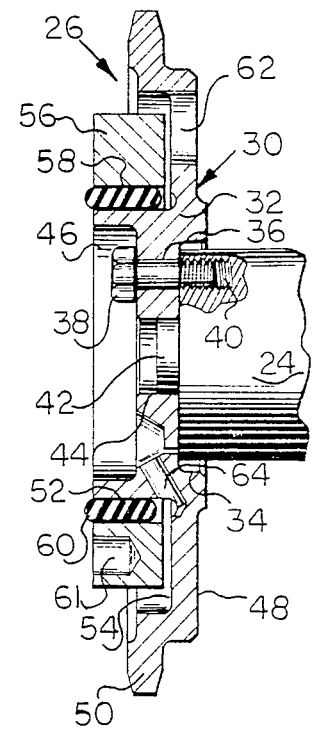
FIG 3

CAMSHAFT DAMPER

BACKGROUND OF THE INVENTION

The intake and exhaust valves of an internal combustion engine are operated by camshafts extending the length of the engine. The camshafts are driven by a sprocket attached to the end of the camshaft and a flexible tension-transmitting member such as a belt or chain meshes with the sprocket for driving the camshaft from the engine crankshaft to synchronize the camshaft and crankshaft rotation.

Due to the length of the camshaft and the cyclic resistance to camshaft rotation that occurs as the engine's valves are operated, and due to the vibrations occurring in the belt or chain, an engine camshaft is subjected to many torsional vibrations. One end of the camshaft may be torsionally vibrating about the camshaft axis with respect to the other end of the camshaft or the camshaft may be vibrating as a rigid body causing the chain or belt to stretch and relax, and thereby act as a spring. Either or both such torsional vibrations cause wear in the belt or chain and also produce excessive wear at the cam surfaces. Further, if the engine ignition distributor is driven by the camshaft, as is common, the torsional vibrations within the camshaft will produce excessive distributor gear wear.

The degree of torsional vibration existing in an internal combustion engine camshaft is directly related to the natural frequency of the camshaft and the frequencies being imposed upon the camshaft during the operation of the engine and, usually, these frequencies are above the normal engine operating range. However, should the rotational speed of the engine match the natural frequency of vibration of the combination of the camshaft and belt or chain, torsional camshaft vibration can become very serious and effective apparatus for controlling such camshaft vibration have not been heretofore available.

It is an object of the invention to provide vibration damping means for camshafts of internal combustion engines wherein torsional vibrations may be damped without significantly adding to the cost of the camshaft-related apparatus, nor significantly adding to the size and configuration of the camshaft-related apparatus.

Another object of the invention is to provide a method for damping torsional vibrations occurring within internal combustion engine crankshafts wherein such vibrations may be absorbed by an elastomeric material associated with the camshaft drive sprocket.

A further object of the invention is to provide a drive sprocket for internal combustion engine camshafts which incorporates torsional vibration damping apparatus, and wherein the cost of manufacture of such a drive sprocket is reasonable and may be accomplished with known manufacturing techniques.

Another object of the invention is to provide a system for damping torsional vibrations within internal combustion engine camshafts wherein modifications to the camshafts are not required, the vibration damping structure being incorporated into the camshaft drive sprocket.

In the practice of the invention a typical internal combustion engine camshaft consists of an elongated shaft having a plurality of axially spaced cylindrical surfaces adapted to be supported upon bearings wherein the camshaft rotates about its axis. Intermediate the bearing surfaces a plurality of cams are located which are engaged by valve lifters which control the intake and exhaust valves of the engine. At its end, the camshaft includes a drive sprocket rigidly fixed thereto for rotating the camshaft.

The drive sprocket includes an outer periphery upon which radially extending projections, recesses or teeth are defined which mesh with a flexible tension-transmitting belt or chain which drives the camshaft. The belt or chain is usually driven by a sprocket-type member mounted on the engine crankshaft wherein rotation of the camshaft, or camshafts, will be synchronized with the rotation of the engine crankshaft.

A cylindrical surface is defined on the camshaft drive sprocket concentric to the camshaft axis and a metal annular inertia ring is mounted upon this cylindrical surface by a ring of elastomeric material. Preferably, the elastomeric material, which may be rubber, neoprene, or the like, is bonded to the sprocket cylindrical surface and a cylindrical surface defined on the inertia ring. Further, the elastomeric material is preferably under compression as confined between the cylindrical surfaces of the sprocket and inertia ring to increase the mechanical and frictional relationship between the elastomeric material and the sprocket and inertia ring.

Torsional vibrations occurring within the camshaft are also imposed upon the drive sprocket, and as the inertia ring is mounted upon the sprocket by the elastomeric material, such torsional vibrations will be damped by the elastomeric material significantly reducing the magnitude of such vibrations.

The torsional vibrations occurring within the camshaft drive sprocket result from the several torsional forces imposed upon the camshaft, such as due to the natural operating frequency of the engine, the operation of the valve lifters engaging the camshaft cams and the minute stretching and contraction of the belt or chain as it drives the sprocket. The elastomeric material supporting the inertia ring is subjected to all such torsional vibrations, and will effectively reduce the magnitude thereof to reduce wear on the cams, belt or chain, and distributor gearing which may be driven from the camshaft.

BRIEF DESCRIPTION OF THE DRAWING

The aforementioned objects and advantages of the invention will be appreciated from the following description and accompanying drawings wherein:

FIG. 1 is an elevational view of a typical internal combustion engine camshaft, sprocket and drive member incorporating the concept of the invention, FIG. 2 is an enlarged, elevational view of the sprocket and sprocket drive chain as taken from the left of FIG. 1, and FIG. 3 is an elevational, diametrical, sectional view as taken along Section III—III of FIG. 2, the chain being omitted for purpose of illustration.

DESCRIPTION OF THE PREFERRED EMBODIMENT

A typical internal combustion engine camshaft 10 is shown in FIG. 1. The camshaft includes an elongated body 12 having an axis of rotation 14, and includes a plurality of cylindrical bearing surfaces 16 axially spaced therealong. In an internal combustion engine, not shown, the camshaft 10 will be rotatably supported by bearings 18, each of which cooperates with a cylindrical bearing surface 16. Intermediate the bearing surfaces 16 are located cams 20 and 22 eccentrically formed with respect to the axis 14 for engagement by the valve lifters of the engine intake and exhaust valves, not shown. In the illustrated embodiment two cams 20 and 22 are shown as located between adjacent bearing surfaces, and it is to be understood that in some camshaft arrangements four cams may be located between bearing surfaces, and the particular construction of the camshaft with respect to the number of cams mounted thereon does not constitute an aspect of the inventive concept. The number of camshafts within an internal combustion engine will vary depending upon the engine design, and the inventive concepts of the invention may be practiced with each camshaft employed in an engine.

The camshaft includes a cylindrical end 24 and a drive sprocket 26 is firmly attached to the camshaft end 24 by fasteners such that no relative rotation between the camshaft body 12 and sprocket 26 can occur. The sprocket 26 is driven by a flexible belt or chain generally indicated at 28, and it is to be appreciated that the particular type of tension belt or chain driving the sprocket does not form an aspect of the instant invention. In the disclosed embodiment the drive sprocket tension drive member is disclosed as being in the form of a flexible roller-link chain.

The construction of the camshaft drive sprocket 26 is best appreciated from FIGS. 2 and 3. The sprocket includes a generally circular metal body 30 having a hub region 32 which includes a cylindrical recess 34 for receiving the camshaft end 24. Axially extending holes 36 are defined in the hub region for receiving the bolts 38 which are screwed within threaded holes 40 defined in the end of the camshaft body. Also, the camshaft body end may include a reduced-diameter portion 42 for receipt within the sprocket central opening 44 to concentrically relate the sprocket to the camshaft body.

At its outer surface the sprocket body 30 is recessed at 46 to accommodate the heads of the bolts 38 and thereby reduce the overall axial length of the sprocket assembly.

The sprocket includes a web 48 having an offset peripheral portion upon which a plurality of radially extending teeth 50 are formed. The teeth 50 are of such configuration as to cooperate with the chain 28 and the rollers of the chain are received between the teeth in the well-known manner.

As best appreciated from FIG. 3, the hub region 32 of the drive sprocket 26 includes a homogeneous concentric cylindrical surface 52 and the web 48 includes recess 54, and the vibration damping structure is integrally associated with the surface 52 and directly mounted on the sprocket body. The vibration damping structure includes an annular inertia ring 56 of a generally rectangular transverse cross section partially received within recess 54 having an inner cylindrical surface 58 and an outer cylindrical surface.

The diameter of the inertia ring inner surface 58 is considerably greater than the diameter of the drive sprocket cylindrical surface 52 wherein an annular spacing exists between the surfaces 52 and 58 when the inertia ring is related to the drive sprocket as shown in FIG. 3. This annular spacing is occupied by the elastomeric material 60. The elastomer 60 is preferably of a rubber or neoprene material having high mechanical strength, and having excellent elastomeric characteristics for the absorption of vibrations. In practice, the elastomeric material is usually forced as a strip, and is then shaped to an annular configuration and forced into the spacing between the surfaces 52 and 58. The normal thickness of the elastomeric material 60 is greater than the radial dimension between the surfaces 52 and 58 wherein forcing of the elastomer into the annular spacing will compress the elastomer producing a strong frictional engagement between the elastomer and the surfaces 52 and 58 thereby maintaining the assembly of the inertia ring 56 on the sprocket 26 as shown in FIG. 3 wherein the inertia ring will be concentric to the axis 14 of the sprocket and the camshaft body 12. This general type of mode of assembly is shown in the assignee's U.S. Pat. Nos. 3.280.654 and 3,457,624.

To further improve the dependability of the mounting of the inertia ring on the drive sprocket surface 52 an adhesive may be applied to the surfaces 52 and 58, or to the elastomer, prior to installation, and this adhesive will produce a bonding additional to the assembly forces produced by the compression of the elastomer 60. If a thermal-activated bonding adhesive is used the sprocket and inertia ring may be heated to activate the adhesive and improve bonding.

To reduce vibrations the inertia ring 56 will usually be accurately balanced on the sprocket. Such balancing may be best achieved by drilling balancing holes 61 in the inertia ring.

Openings 62 are defined in the web 48 of the sprocket to provide air flow past the elastomer 60 and inertia ring 56 to reduce the temperature thereof during operation, and radial passages 64, as shown in FIG. 3, are defined in the hub region of the drive sprocket intersecting recess 46 and the spacing between inertia ring 56 and web 48 permit oil pumped through passages in camshaft 10 and seeping into recess 46 to flow past the elastomer and inertia ring through recess 54 by centrifugal force to be deposited on the chain 28 for lubrication.

The drive chain 28 will mesh with the teeth 50 of the camshaft drive sprocket 26 as shown in FIG. 2, and the chain 28 may be connected to the engine crankshaft, not shown, or other drive sprocket synchronized with the rotation of the engine crankshaft. In this manner, the chain 28 will drive the sprocket 26 and rotate the camshaft 10 in timed relationship to the crankshaft.

Torsional vibrations occur within the camshaft body 12 due to the length of the camshaft, the engine vibration, the cyclic resistance to camshaft rotation as produced by the valve lifters and valve-operating structure engaging the cams 20 and 22, and the variation in the tension forces occurring within the chain 28 as it minutely stretches and expands during normal operation as it rotates the camshaft. Such torsional vibrations will be imposed upon the elastomer 60 due to the ability of the inertia ring 56 to oscillate relative to the drive sprocket body 30 about the sprocket axis, and the energy produced by the absorption of the vibrations at the elastomer will be dissipated as heat, as is well known with rotational vibration dampers.

In some camshaft systems the camshaft 10 may be considered to constitute a rigid body and the torsional vibrations imposed on the camshaft primarily occur due to the cyclic stretching and relaxing of the chain. In such instance the chain or belt functions as a spring imposing torsional vibrations on the rigid camshaft. Such torsional vibrations are also effectively damped by the structure of the invention.

Accordingly, the presence of the elastomeric material 60 and the inertia ring 56 as mounted on the drive sprocket will reduce the torsional vibrations occurring within the camshaft system, and cam wear will be reduced, as will the wear within the chain 28. As it is also common to drive ignition distributors from camshaft structure the absorption of camshaft vibrations will also increase the effective life of distributor gearing.

It is to be appreciated that while the disclosed embodiment illustrates a chain as associated with the drive sprocket 26, and illustrates teeth on the sprocket for cooperation with the chain. It is also common to utilize flexible nonmetallic timing and drive belts with camshaft sprockets, and such belts usually utilize cogs or ribs which are received within recesses defined in the periphery of the camshaft sprocket. The inventive concepts of the invention are practiced whether the camshaft sprocket is driven by a chain or by a belt having cogs or ribs defined thereon, and the presence of torsional vibrations within the camshaft system occur regardless of the type of flexible sprocket drive system used.

Various modifications to the inventive concepts may be apparent to those skilled in the art without departing from the scope of the invention. For instance, the elastomer 60 can be located on the outer periphery of the inertia ring 56, rather than at the inner periphery. In such instance the axial thickness of the sprocket adjacent the teeth 50 will be greater than illustrated so that the outer diameter of recess 54 will be in radially opposed relationship to the outer periphery of the inertia ring 56 and an elastomeric ring may be interposed therebetween for mounting the inertia ring on the sprocket at its outer periphery.

I claim:

1. A drive sprocket for an internal combustion engine camshaft comprising, in combination, a circular body having a hub region, an outer periphery and an axis of rotation, means defined in said hub region for attaching said body to the end of the camshaft in torsion-transmitting relationship, radial extending drive surfaces defined on said body periphery for meshing with a flexible tension-transmitting member, a cylindrical surface homogeneously defined on said body concentric to said axis, an annular ring of synthetic elastomeric material mounted upon said cylindrical surface, and an annular inertia ring mounted upon said elastomeric material, said inertia ring including an inner cylindrical surface, said elastomeric material being bonded to said compressed between said cylindrical surfaces of said sprocket body and said inertia ring, said sprocket body cylindrical surface, elastomeric material and said inertia ring comprising torsional vibration damping means directly mounted upon said body and integral with said body for damping torsional vibrations about said body axis, said sprocket including a web radially extending between said hub region and said outer periphery, said inertia ring, body cylindrical surface and elastomeric material being located adjacent to and in axial alignment with said web, and an oil passage defined in said sprocket hub region extending from said hub region to adjacent said body outer periphery along said web for lubricating said tension transmitting member.

* * * * *